United States Patent [19]

Beckerle et al.

[11] 4,409,352

[45] Oct. 11, 1983

[54] METHOD OF MAKING A DISPERSION LACQUER FOR LUMINESCENT SCREENS

[75] Inventors: Heinz Beckerle, Aichwald; Lothar Huster, Plochingen; Rolf Zondler, Stuttgart, all of Fed. Rep. of Germany

[73] Assignee: International Standard Electric Corporation, New York, N.Y.

[21] Appl. No.: 326,639

[22] Filed: Dec. 2, 1981

[30] Foreign Application Priority Data

Dec. 9, 1980 [DE] Fed. Rep. of Germany ....... 3046373

[51] Int. Cl.³ .............................................. C08K 3/38
[52] U.S. Cl. ..................................................... 524/405
[58] Field of Search ......................................... 524/405

[56] References Cited

U.S. PATENT DOCUMENTS

| | | | |
|---|---|---|---|
| 2,022,827 | 12/1935 | Ruben | 524/405 |
| 2,324,601 | 7/1943 | Spanagel | 524/405 |
| 2,507,143 | 5/1950 | Chaban | 524/405 |
| 2,664,409 | 12/1953 | Aickin et al. | 524/405 |
| 3,062,677 | 11/1962 | Wong | 524/405 |
| 3,438,808 | 4/1969 | Hawkins et al. | 524/405 |

FOREIGN PATENT DOCUMENTS 1200959  8/1970  United Kingdom .

OTHER PUBLICATIONS

Hackh's Chemical Dictionary–pp. 106 and 421.

*Primary Examiner*—Joseph L. Schofer
*Assistant Examiner*—N. Sarofim
*Attorney, Agent, or Firm*—John T. O'Halloran; Alfred C. Hill

[57] ABSTRACT

After being deposited on the luminescent screen, the dispersion lacquer made by the method disclosed forms a smooth and uniform film whose fluidity can be influenced. This results in an improved reflectance behavior of the deposited aluminum film and, thus, in greater picture brightness.

The disclosed method consists in that a boric-acid solution is added to the dispersion lacquer which is then set to the desired viscosity by means of a neutralizer.

10 Claims, No Drawings

METHOD OF MAKING A DISPERSION LACQUER FOR LUMINESCENT SCREENS

The present invention relates to a method of making a dispersion lacquer intended for use as a volatilizable substrate layer during the metallization of a luminescent screen, wherein an aqueous emulsion of a polyacrylate, an aqueous polyvinyl-alcohol solution, an additional inorganic binder, and an oxidizing agent are mixed.

During the manufacture of a luminescent screen, the phosphor layer is covered with a dispersion lacquer serving as a substrate layer on which the metal layer is then deposited by evaporation, after which the inorganic material in the luminescent screen and the substrate layer are volatilized.

It is known, e.g. from DE-AS No. 14 89 237, to use a suspension of polyvinyl acetate, polyvinyl alcohol, and acrylic resins for the substrate layer during the metallization of luminescent screens. It is also known (DE-OS No. 18 11 763) to make such a substrate layer from an acrylate copolymer, colloidal silicic acid, a neutralizer, a soluble silicate, and a boric-acid complex of polyvinyl alcohol.

The following difficulties have been encounteed in practice:
1. difficulties in making a homogeneous substrate layer and high scrap rate;
2. changes in the metal layer during the baking-out of the organic constituents, and
3. insufficient reflectance behaviour of the metal mirror.

Accordingly, the object of the invention is to provide a dispersion paint for luminescent screens which, after being deposited on the screen, does not have the disadvantages described above. A smooth and uniform paint film is to be provided whose fluidity can be influenced, which results in an improved reflectance behaviour of the deposited aluminum film, so that an improvement in picture brightness is obtained.

According to the invention, a boric-acid solution is added to the dispersion obtained, and the dispersion lacquer is then set to a given pH value and, thus, to a desired viscosity by means of a neutralizer.

Advantageously, a 0.1–5 weight percent boric-acid solution is added to the dispersion obtained, the percentage by weight of boric acid referred to the content of solid acrylate in the dispersion being preferably 0.1 to 10%.

Depending on the desired viscosity of the dispersion lacquer, the pH value is then set to 4 to 9 by means of one or more neutralizers; this correponds to a viscosity of the lacquer of 1.5 to 10 mPa·s (at 20° C.). Suitable neutralizers are alkali hydroxides, ammonium hydroxide or amines.

The polyacrylate may also be an acrylate copolymer or an acrylic-resin emulsion; the polyvinyl alcohol used preferably has an average molecular weight of 80,000 to 100,000 and a degree of saponification of 80–90 mole %.

Another suitable inorganic binder is colloidal silicic acid or a soluble silicate. The oxidizing agent is preferably an aqueous hydrogen-peroxide solution, but it is also possible to use aqueous solutions of nitric acid, alkali peroxides, alkali borates or alkali perborates.

An embodiment of the invention will now be explained in greater detail:

EXAMPLE

In a 5.000-$cm^3$ beaker, 150 grams of a 10% polyvinyl-alcohol solution (Mowiol 40–88) and 2,290 grams of demineralized water are stirred together for 5 minutes. Then, 500 grams of a 4% boric-acid solution are added slowly with stirring. After all of the boric-acid solution has been added, the stirring is continued for another 10 minutes, after which 1,776 grams of a 38% polyacrylate dispersion (B 74), 67 grams of a 30% hydrogen-peroxide solution, and 217 grams of a 30% colloidal silicic-acid solution (Ludox) are respectively added at 10-minute intervals with continued stirring. 10 minutes after the last addition, the pH of the mixture is determined, which is then set to a value of 6.5 by means of a 2-M ammonia solution. A measurement with a viscometer shows that the dispersion thus obtained has a viscosity of 1.8 mPa·s at a temperature of 20° C.

The principal advantage of the dispersion lacquer according to the invention are that the manufacturing process is uncritical and less susceptible to trouble than the processes for making prior art lacquers for this purpose. In addition, because of the lower solid content, the portion of organic ingredients to be volatilized is reduced. As the dispersion lacquer has a lower foam stability, a substantially bubble- and lump-free lacquer film is obtained on the screen.

Another big advantage of the dispersion lacquer according to the invention is that its fluidity with unchanged solid content can be controlled via the pH value of the dispersion. This makes it possible to produce dispersion lacquers which form smooth and homogeneous substrate layers and impart this uniformity to the aluminum layer subsequently deposited thereon. This improves the reflectance behaviour of the deposited aluminum film and, consequently, the brightness of the picture. The improvement in picture brightness is about 5%.

In addition, it is possible to concentrate this brightness gain on given individual colors by changing the silicic-acid content and the pH value, thereby compensating, to a certain extent, for brightness differences from green to blue to red.

We claim:
1. Method of making a dispersion lacquer containing a boric-acid compound and intended for use as a volatilizable substrate layer during the metallization of a luminescent screen, wherein an aqueous emission of a polyacrylate, an inorganic binder, and an oxidizing agent are used, the improvement comprising the steps of:
   adding an aqueous solution of a polyvinylalcohol and a boric-acid solution as separate ingredients at approximately room temperature; and
   adding a neutralizer to adjust the pH value of the dispersion lacquer to a desired level, whereby a desired viscosity is obtained.
2. A method as claimed in claim 1, wherein a 0.1–5 weight percent boric-acid solution is added to the dispersion.
3. A method as claimed in claim 1, wherein 0.1 to 10 percent by weight of boric acid referred to the content of solid acrylate in the dispersion is added.
4. A method as claimed in claim 1, wherein the dispersion is set to a pH value of 4 to 9 by means of the neutralizer.
5. A method as claimed in claim 1, wherein the neutralizer added to the dispersion is selected from the group comprising alkali hydroxides, ammonium hydroxide and amines.

6. A method as claimed in claim 2, wherein 0.1 to 10% by weight of boric acid referred to the content of solid acrylate in the dispersion is added.

7. A method as claimed in claim 2, wherein the neutralizer added to the dispersion is selected from the group comprising alkali hydroxides, ammonium hydroxide and amines.

8. A method as claimed in claim 3, wherein the neutralizer added to the dispersion is selected from the group comprising alkali hydroxides, ammonium hydroxide and amines.

9. A method as claimed in claim 4, wherein the neutralizer added to the dispersion is selected from the group comprising alkali hydroxides, ammonium hydroxide and amines.

10. A method as claimed in claim 6, wherein the neutralizer added to the dispersion is selected from the group comprising alkali hydroxides, ammonium hydroxide and amines.

* * * * *